United States Patent [19]
Franz et al.

[11] Patent Number: 5,523,162
[45] Date of Patent: *Jun. 4, 1996

[54] WATER REPELLENT SURFACE TREATMENT FOR PLASTIC AND COATED PLASTIC SUBSTRATES

[75] Inventors: Helmut Franz, Pittsburgh; George B. Goodwin, Mars; Gary J. Marietti, Cheswick, all of Pa.

[73] Assignee: PPG Industries, Inc., Pittsburgh, Pa.

[ * ] Notice: The term of this patent shall not extend beyond the expiration date of Pat. No. 5,328,768.

[21] Appl. No.: 363,804

[22] Filed: Dec. 27, 1994

Related U.S. Application Data

[63] Continuation-in-part of Ser. No. 220,353, Mar. 30, 1994, abandoned, which is a continuation-in-part of Ser. No. 589,235, Sep. 28, 1990, Pat. No. 5,308,705, which is a continuation-in-part of Ser. No. 503,587, Apr. 3, 1990, Pat. No. 4,983,459.

[51] Int. Cl.$^6$ .................................................. B32B 27/00
[52] U.S. Cl. .................. 428/421; 427/384; 427/387; 427/389.7; 427/397.7; 427/402; 427/407.1; 427/444; 428/422; 428/429; 428/446; 428/447
[58] Field of Search .................... 428/421, 422, 428/447, 446, 429; 427/402, 407.1–412.1, 444, 384, 387, 165, 389.7, 397.7

[56] References Cited

U.S. PATENT DOCUMENTS

| | | | |
|---|---|---|---|
| 4,983,459 | 1/1991 | Franz et al. | 428/410 |
| 4,997,684 | 3/1991 | Franz et al. | 427/384 |
| 5,308,705 | 5/1994 | Franz et al. | 428/421 |
| 5,328,768 | 7/1994 | Goodwin | 428/428 |
| 5,368,892 | 11/1994 | Berquier | 427/299 |

FOREIGN PATENT DOCUMENTS

| | | |
|---|---|---|
| 0166363 | 1/1986 | European Pat. Off. . |
| 0476510 | 3/1992 | European Pat. Off. . |
| 02/311332 | 3/1991 | Japan . |

Primary Examiner—D. S. Makarani
Assistant Examiner—H. Thi Le
Attorney, Agent, or Firm—Donald C. Lepiane

[57] ABSTRACT

A method and article are disclosed wherein a plastic substrate is provided with a more durable non-wetting surface by deposition of a silica primer layer prior to treatment with perfluoroalkylalkylsilane and optionally a fluorinated olefin telomer on the surface which comprises the silica primer layer.

18 Claims, 1 Drawing Sheet

WATER REPELLENT SURFACE TREATMENT FOR PLASTIC AND COATED PLASTIC SUBSTRATES

CROSS REFERENCE TO RELATED APPLICATION

This application is a continuation-in-part of U.S. application Ser. No. 07/220,353 filed Mar. 30, 1994, which is a continuation-in-part of U.S. application Ser. No. 07/589,235 filed Sep. 28, 1990, now U.S. Pat. No. 5,308,705 which is a continuation-in-part of application Ser. No. 07/503,587 filed Apr. 3, 1990, which is now U.S. Pat. No. 4,983,459.

BACKGROUND

The present invention relates generally to the art of surface treatment and, more particularly, to the art of producing a durable water repellent surface on various plastic and coated plastic substrates.

THE PRIOR ART

European Patent Application No. 92107814.3 (Publication Number 0 513 690 A2) of Yoneda et al. describes a surface-treated substrate having at least two treated surface layers wherein the first outermost layer is obtained by treatment with a compound forming a surface having a contact angle of at least 70° against water and the second underlayer is obtained by treatment with at least one reactive silane compound selected from isocyanate silane compounds and hydrolyzable silane compounds.

U.S. Pat. Nos. 4,983,459 and 4,997,684 to Franz et al. disclose an article and method respectively for providing a durable nonwetting surface on glass by treatment with a perfluoroalkylalkyl silane and a fluorinated olefin telomer.

In U.S. Pat. No. 5,308,705, Franz et al. describe providing nonwetting surface properties to substrates other than glass by treatment with a perfluoroalkylalkyl silane and a fluorinated olefin telomer.

In U.S. Pat. No. 5,328,768, Goodwin discloses a glass substrate the surface of which is treated with first a silica primer layer and second a perfluoroalkylalkyl silane.

SUMMARY OF THE INVENTION

The present invention provides a plastic or coated plastic substrate surface with high water repellency and high lubricity. Durable water and dirt repellency of a substrate surface are provided by applying to the substrate surface a silica primer layer followed by a perfluoroalkylalkylsilane compound.

DESCRIPTION OF THE PREFERRED EMBODIMENT

Figure 1:
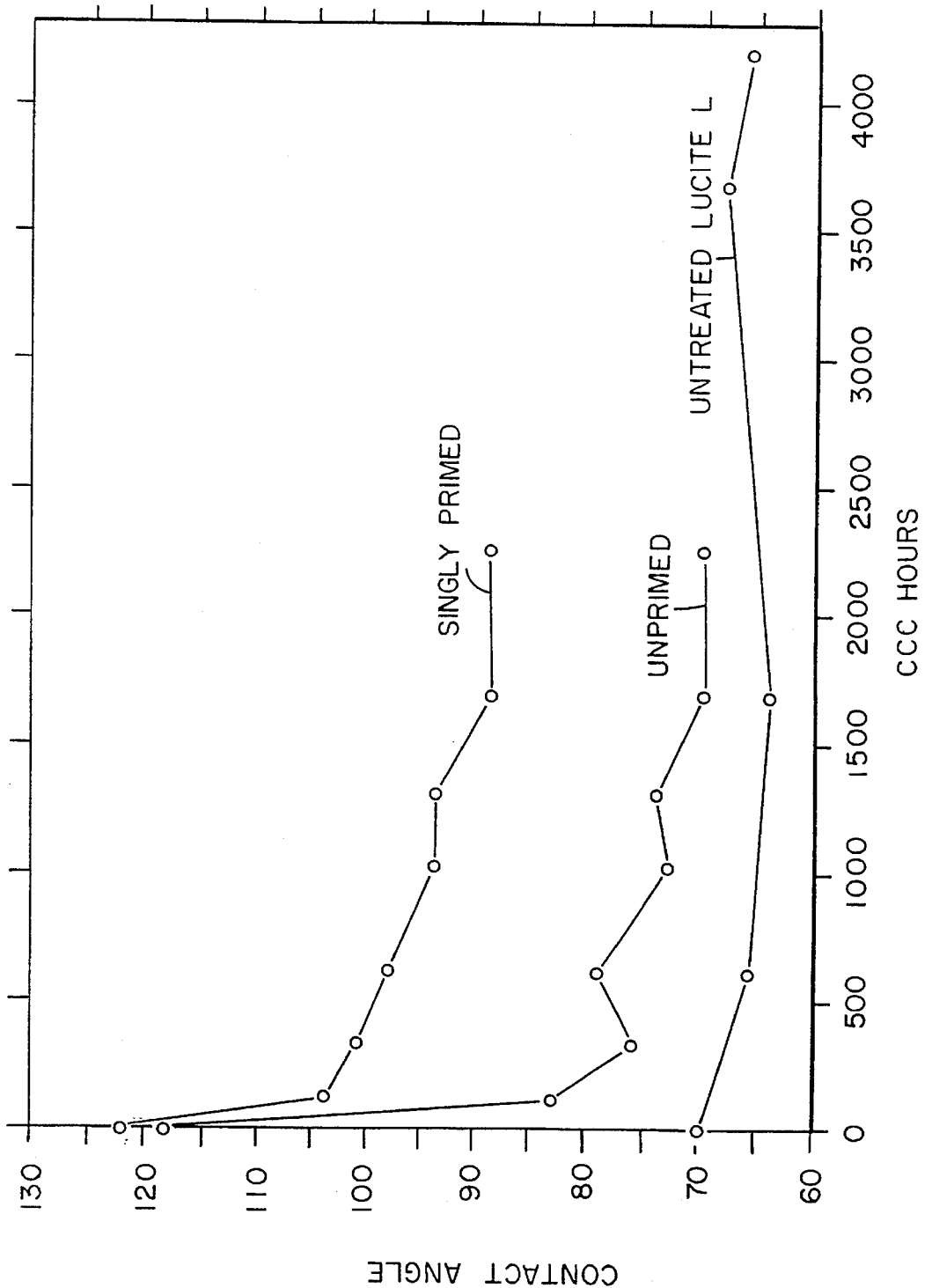
FIG. 1 illustrates the improvement in durability of a nonwetting perfluoroalkylalkylsilane surface treatment employing a primer on plastic in accordance with the present invention. The figure shows the contact angle as a function of exposure in a Cleveland Condensing Cabinet for untreated, treated but unprimed, and primed and treated acrylic surfaces.

Improved durability of rain and soil repellency provided by a perfluoroalkylalkylsilane surface treatment of plastic and coated plastic substrate surfaces is obtained by the use of a silica primer layer. In accordance with the present invention, the silica primer layer is preferably deposited by magnetron sputtering, or applied by a sol-gel condensation reaction, i.e. from alkyl silicates or hydrolyzable silicon-containing compounds such as tetra-acetoxysilane or chlorosilanes, preferably tetrachlorosilane, hexachlorodisiloxane, or partially hydrolyzed and condensed mixtures thereof.

A perfluoroalkylalkylsilane is applied to the silica-primed surface of a plastic or coated plastic substrate to produce the article of the present invention. The perfluoroalkylalkylsilane composition is preferably employed as a solution, preferably in a fluorinated solvent. The solution of the present invention is applied to a substrate surface by any conventional technique such as dipping, flowing, wiping or spraying. The solvent is evaporated and the composition forms a durable, non-wetting, lubricating surface.

Preferred perfluoroalkylalkylsilanes have the general formula $R_m(R'_n)SiX_{4-m-n}$ wherein R is a perfluoroalkylalkyl radical; m is typically one, n is typically zero or one, and m+n is less than 4; R' is a vinyl or an alkyl radical, preferably methyl, ethyl, vinyl or propyl; and X is preferably a radical such as halogen, acyl, and/or alkoxy. Preferred perfluoroalkyl moieties in the perfluoroalkylalkyl radicals range from $CF_3$ to $C_{30}F_{61}$, preferably $C_6F_{13}$ to $C_{18}F_{37}$, and most preferably $C_8F_{17}$ to $C_{12}F_{25}$; the alkyl moiety is preferably ethyl. R' is preferably methyl. Preferred radicals for X include chloro, bromo, iodo, methoxy, ethoxy and acetoxy radicals. Preferred perfluoroalkylethylsilanes in accordance with the present invention include perfluoroalkylethyltrichlorosilane, perfluoroalkylethyltrimethoxysilane, perfluoroalkylethyltriacetoxysilane, perfluoroalkylethyldichloro(methyl)silane and perfluoroalkylethyldiethoxy(methyl)silane.

These perfluoroalkylethylsilanes appear to react with bonding sites at the silica primed plastic substrate surface on a molecular basis. Strong surface bonding of the perfluoroalkylethylsilanes produces a durable substrate surface which exhibits a high contact angle with a drop of water, indicating high water repellency. The perfluoroalkylalkylsilane may be combined with a fluorinated olefin. The fluorinated olefin telomer, which does not on its own bond to the substrate surface, provides for delayed hydrolysis of the Si-X species to produce a durable surface via enhanced reactivity with the glass surface. Preferred olefin telomers have the general formula $C_mF_{2m+1}CH=CH_2$ wherein m may range from 1 to 30. The more preferred olefin telomers are a mixture of compounds of the above formula wherein m ranges from 1 to 16, preferably 8 to 12.

The perfluoroalkylalkylsilane and optional fluorinated olefins are preferably applied in solution. Suitable solvents include isopropanol, ethanol, hexane, heptane, mineral spirits, acetone, toluene and naphtha. Preferred solvents are halogenated hydrocarbon solvents such as trichlorotrifluoroethane, and methylene chloride, and perfluorinated organic compounds such as perfluorocarbons. Concentrations of about 0.005 to 50, preferably about 0.05 to 5, percent by weight of silane are preferred. The solvent is preferably evaporated simply by drying in air at ambient temperature. The silanes may also be crosslinked to form a more durable coating. Preferably, curing is accomplished by heating the silane treated surface. Typically, curing temperatures of at least 150° F. (about 66° C.) are preferred, particularly above 200° F. (about 93° C.). A cure cycle of about 200° F. (about 93° C.) for about 30 minutes is suitable. Higher temperatures and shorter heating times may be more efficient, limited to temperatures which do not degrade the substrate. A preferred maximum temperature for a polycarbonate substrate may be about 160° C. A preferred maximum temperature for acrylic may be about 100° C. Stretched acrylic substrates are more preferably heated only to about 80° C.

The contact angles recited herein are measured by the sessile drop method using a modified captive bubble indicator manufactured by Lord Manufacturing, Inc., equipped with Gaertner Scientific Goniometer optics. The surface to be measured is placed in a horizontal position, facing upward, in front of a light source. A drop of water is placed on top of the surface in front of the light source so that the profile of the sessile drop can be viewed and the contact angle measured through the goniometer telescope equipped with circular protractor graduation.

The use of a relatively thick (about 1000 Angstroms) silica primer layer, intermediate thickness (about 200 Angstroms) magnetron sputtered silica primer layer, or a thinner (about 100 Angstroms) sol-gel applied silica primer layer on the surface of plastic substrates such as acrylic and polyurethane and coated plastics such as acrylate or urethane coated polycarbonate increases the resistance of the silane surface treatment in accelerated weathering tests.

Various other materials suitable for the preparation of silica films include silicon tetrahalides (or partially hydrolyzed/condensed silicon halides, preferably chlorides), silicon tetracarboxylates (preferably acetate), and other silanes or polysiloxanes which will hydrolyze with atmospheric and physisorbed water to produce a silica coating on a plastic or coated plastic surface. Sources of silica which do not readily hydrolyze are also suitable if a thin film of silica (or other inorganic oxide) can be prepared. Examples include tetraalkylammonium silicates, sodium silicates, and colloidal silicates. Variations which include other metal oxide salts or colloids are also useful.

The use of a mixed oxide primer will be understood to be a variation of the primer composition. Materials suitable for mixture include halides, alkoxides, and carboxylates of alumina, titanium, zirconium, and sodium. The material is chosen so as to hydrolyze with moisture and condense to produce an oxide coating.

The tetrachlorosilane or chlorosiloxane primers are also preferred since the application method requires simple methods and this primer can be applied to any plastic or coated plastic. Suitable solvents for the primer include anhydrous solvents such as perfluorocarbons, 1,1,2-trichlorotrifluoroethane, trichloroethane, methylene chloride, hydrocarbons, and other solvents without an active hydrogen. Most preferable are perfluorocarbons and hydrocarbons due to their inherent dryness and environmental considerations. Concentrations can range from about 0.01 to 100 percent by weight depending upon material and application method with a most preferable concentration range of 0.1 to 3 percent by weight.

The present invention will be further understood from the descriptions of specific examples which follow.

EXAMPLE I

A 3 by 4 inch (7.6 by 10.2 centimeter) sheet of cast acrylic was cleaned with hexane then methanol. A primer solution comprising 0.8 percent by weight tetrachlorosilane in Fluorinert® FC-77 (product of 3M) fluorocarbon solvent was applied. The solution was allowed to dry at ambient temperature. The primed acrylic surface was then contacted with a solution of 2.5 weight percent each of perfluoroalkylalkyltrichlorosilane and perfluoroalkylethylene in FC-77 fluorocarbon solvent. The perfluoroalkyl moiety comprised primarily $C_6$ to $C_{18}$ perfluoroalkyl groups, and the alkyl moiety was ethyl. After 2 minutes at ambient temperatures, the excess solution was washed off the surface using FC-77 solvent. The contact angle was 113° to 115°.

EXAMPLE II

Three different acrylic substrates from different sources, Lucite L (DuPont), Plex MC (Rohm and Haas) and Acrylite FF (Cyro Industries), were treated as follows. One set of each was treated respectively with the perfluoroalkylalkylsilane of the previous example (unprimed), and with the primer and perfluoroalkylalkylsilane of the previous example. The contact angles for all samples were in the range of 117° to 123° initially.

Some of these treated acrylic samples were exposed in a Cleveland Condensing Cabinet (CCC), constantly condensing water vapor at 140° F. (60° C.). Periodically, the coupons were checked for wettability as measured by contact angle of a sessile drop of water. These results are reported in the following table.

TABLE

| CCC (hours) | Contact Angle (°) | | | | | |
|---|---|---|---|---|---|---|
| | Lucite L | | Plex MC | | Acrylite FF | |
| | Unprimed | Primed | Unprimed | Primed | Unprimed | Primed |
| 1 | 117 | 123 | 119 | 121 | 119 | 123 |
| 115 | 85 | 100 | 80 | 99 | 84 | 113 |
| 328 | 73 | 98 | 74 | 96 | 81 | 108 |
| 609 | 83 | 96 | 75 | 91 | 79 | 108 |
| 1015 | 72 | 94 | 72 | 87 | 75 | 101 |
| 1299 | 73 | 94 | 74 | 87 | 75 | 100 |
| 1676 | 69 | 89 | 69 | 84 | 72 | 93 |
| 2252 | 70 | 90 | 69 | 85 | 70 | 91 |

EXAMPLE III

Primer solution and perfluoroalkylalkylsilane solution were prepared as in Example I. Lucite L acrylic substrates were treated with perfluoroalkylalkylsilane solution with and without primer solution.

These treated acrylic samples were exposed in a Cleveland Condensing Cabinet and QUVB-313 apparatus. The results are reported in the following table.

Some of these treated acrylic samples were exposed in a QUV-Test, QUVB-313, which is a cyclic light and humidity test using UVB-313 lamps, cycled 8 hours UV light at 65° C. black panel temperature followed by 4 hours dark humidity cycle at 50° C. Periodically, the coupons were checked for wettability as measured by contact angle of a sessile drop of water. These results are reported in the following table.

TABLE

| CCC | Contact Angle (°) | | QUVB | Contact Angle (°) | |
|---|---|---|---|---|---|
| (hours) | Unprimed | Primed | (hours) | Unprimed | Primed |
| 0 | 117 | 121 | 0 | 113 | 118 |
| 122 | 95 | 116 | 144 | 65 | 118 |
| 219 | 94 | 107 | 310 | | 113 |
| 454 | 81 | 98 | 566 | | 114 |
| 712 | 68 | 93 | 1255 | | 85 |
| 930 | 71 | 91 | | | |
| 1219 | 70 | 87 | | | |

EXAMPLE IV

Samples of urethane-ester polymer prepared from the reaction of diisocyanate and a polyol reaction product of trimethylolpropane and caprolactone were treated with the perfluoroalkylalkyl solution of Example I, with and without the primer solution of Example I. The surfaces of untreated, perfluoroalkylalkylsilane treated, and silane primer and perfluoroalkylalkylsilane treated polyurethane were evaluated by measuring the contact angle of a sessile drop of water. The untreated polyurethane surface had a contact angle of 84°, the perfluoroalkylalkylsilane treated surface had an initial contact angle of 114°, and the polyurethane surface treated with both primer and perfluoroalkylalkylsilane had a contact angle of 125°.

The above examples are offered to illustrate the present invention. Various hydrolyzable silanes, perfluoroalkylalkylsilanes, solvents and concentrations may be applied by any conventional technique, and optionally cured at suitable temperatures for adequate times to provide durable non-wetting surfaces to any of a variety of plastic and coated plastic substrates such as acrylic, urethane, polycarbonate and other polymers. The treated substrates of the present invention are especially suitable in automobile and aircraft parts, as well as in building components.

We claim:

1. An article comprising a plastic substrate the surface of which is coated with
    a. a silica primer layer; and
    b. a perfluoroalkylalkylsilane bonded to said silica primer layer wherein said perfluoroalkylalkylsilane is selected from compounds having the general formula $R_m(R'_n)SiX_{4-n-m}$, wherein R is a perfluoroalkylalkyl radical, R' is selected from the group consisting of vinyl and alkyl radicals, m is one, n is zero or one, m+n is less than 4, and X is a radical selected from the group consisting of halogen, alkoxy and acyl radicals.

2. An article according to claim 1, wherein said perfluoroalkylalkyl radical comprises a perfluoroalkyl moiety of the formulae $CF_3$ to $C_{30}F_{61}$.

3. An article according to claim 2, wherein said perfluoroalkyl moiety comprises $C_6F_{13}$ to $C_{18}F_{37}$.

4. An article according to claim 3, wherein said perfluoroalkyl moiety comprises $C_8F_{17}$ to $C_{12}F_{25}$.

5. An article according to claim 1, wherein R' is selected from the group consisting of methyl, ethyl, vinyl and propyl.

6. An article according to claim 1, wherein X is selected from the group consisting of chloro, iodo, bromo, methoxy, ethoxy and acetoxy.

7. An article according to claim 1, wherein said substrate is acrylic, and said perfluoroalkylalkylsilane is selected from the group consisting of perfluoroalkylethyltrichlorosilane, perfluoroalkylethyltriacetoxysilane, perfluoroalkylethyltrimethoxysilane, perfluoroalkylethyldichloro(ethyl)silane and perfluoroalkylethyldiethoxy(methyl)silane.

8. An article according to claim 7, wherein said perfluoroalkylalkylsilane is combined with a fluorinated olefin telomer.

9. An article according to claim 8, wherein said fluorinated olefin is a telomer comprises $C_mF_{2m+1}CH=CH_2$, wherein m is from 1 to 30.

10. A method of producing a non-wetting surface on a plastic substrate comprising the steps of:
    a. depositing a silica primer layer on a surface of said substrate; and
    b. depositing on said silica primer layer a composition comprising a perfluoroalkylalkylsilane wherein said perfluoroalkylalkylsilane is selected from compounds having the general formula $R_m(R'_n)SiX_{4-n-m}$, wherein R is a perfluoroalkylalkyl radical, R' is selected from the group consisting of vinyl and alkyl radicals, m is one, n is zero or one, m+n is less than 4, and X is a radical selected from the group consisting of halogen, alkoxy and acyl radicals.

11. A method according to claim 10, wherein said perfluoroalkylalkyl radical comprises a perfluoroalkyl moiety of the formulae $CF_3$ to $C_{30}F_{61}$.

12. A method according to claim 11, wherein said composition further comprises a fluorinated olefin telomer.

13. A method according to claim 12, wherein the step of depositing a silica primer layer is accomplished by applying to the substrate surface a solution of a hydrolyzable silicon-containing compound which hydrolyzes and condenses to form a silica-containing film on the substrate surface.

14. A method according to claim 13, wherein said hydrolyzable silicon-containing compound is selected from the group consisting of tetrachlorosilane, tetraacetoxysilane, hexachlorodisiloxane, and mixtures thereof.

15. A method according to claim 14, wherein said perfluoroalkylalkylsilane is selected from the group consisting of perfluoroalkylethyltrichlorosilane, perfluoroalkylethyltriacetoxysilane, perfluoroalkylethyltrimethoxysilane, perfluoroalkylethyldichloro(methyl)silane and perfluoroalkylethyldiethoxy(methyl)silane, and wherein said fluorinated olefin is a telomer comprising $C_mF_{2m+1}CH=CH_2$, wherein m is from 1 to 30.

16. A method according to claim 14, wherein R' is selected from the group consisting of methyl, ethyl, vinyl and propyl.

17. A method according to claim 16, wherein X is selected from the group consisting of chloro, iodo, bromo, methoxy, ethoxy and acetoxy.

18. A method according to claim 15, wherein said telomer comprises $C_mF_{2m+1}CH=CH_2$ wherein m is from 4 to 10.

* * * * *

UNITED STATES PATENT AND TRADEMARK OFFICE
CERTIFICATE OF CORRECTION

PATENT NO.  :  5,523,162
DATED       :  June 4, 1996
INVENTOR(S) :  Helmut Franz, George B. Goodwin and Gary J. Marietti It is certified that error appears in the above-indentified patent and that said Letters Patent is hereby corrected as shown below:

Col. 5, Claim 1, line 31, after "layer" insert --,--.

Col. 6, Claim 10, line 14, before "wherein" insert -- , --.

Signed and Sealed this

Fourth Day of March, 1997

Attest:

BRUCE LEHMAN

Attesting Officer

Commissioner of Patents and Trademarks